United States Patent
Fuglesang et al.

(10) Patent No.: US 11,555,498 B2
(45) Date of Patent: Jan. 17, 2023

(54) MAGNETIC COUPLING ASSEMBLIES AND PUMP, TURBINE, AND COMPRESSOR INCLUDING THE MAGNETIC COUPLING ASSEMBLY

(71) Applicant: FSubsea AS, Oslo (NO)

(72) Inventors: Alexander Fuglesang, Oslo (NO); Tommy Westberg, Torsby (SE); Thomas Navjord, Våle (NO); Marius Kruse Aas, Billingstad (NO)

(73) Assignee: FSubsea AS, Oslo (NO)

( * ) Notice: Subject to any disclaimer, the term of this patent is extended or adjusted under 35 U.S.C. 154(b) by 210 days.

(21) Appl. No.: 16/603,355

(22) PCT Filed: Apr. 11, 2018

(86) PCT No.: PCT/NO2018/050099
§ 371 (c)(1),
(2) Date: Oct. 7, 2019

(87) PCT Pub. No.: WO2018/190726
PCT Pub. Date: Oct. 18, 2018

(65) Prior Publication Data
US 2020/0291946 A1 Sep. 17, 2020

Related U.S. Application Data

(60) Provisional application No. 62/484,166, filed on Apr. 11, 2017.

(30) Foreign Application Priority Data

Dec. 21, 2017 (NO) .................................... 20172030

(51) Int. Cl.
*F04D 13/02* (2006.01)
*H02K 49/10* (2006.01)
(Continued)

(52) U.S. Cl.
CPC ......... *F04D 13/024* (2013.01); *F04D 25/026* (2013.01); *H02K 49/104* (2013.01); *H02K 49/106* (2013.01); *F04D 29/026* (2013.01)

(58) Field of Classification Search
CPC .... F04D 13/024; F04D 25/026; F04D 29/047; F04D 29/057; F04D 29/584;
(Continued)

(56) References Cited

U.S. PATENT DOCUMENTS 4,207,485 A * 6/1980 Silver ...................... H02K 9/19
310/104
4,732,225 A 3/1988 Jurgens et al.
(Continued)

FOREIGN PATENT DOCUMENTS

DE 2840137 A1 3/1980
DE 3413930 A1 10/1985
(Continued)

OTHER PUBLICATIONS

Bergheim, Olav; International Search Report for PCT/NO2018/050099; dated Jun. 27, 2018; 4 pages.

*Primary Examiner* — Charles G Freay
*Assistant Examiner* — Lilya Pekarskaya
(74) *Attorney, Agent, or Firm* — Shackelford, Bowen, McKinley & Norton, LLP (57) ABSTRACT

A magnetic coupling assembly includes a rotatable male coupling member, a rotatable female coupling member, a static separation member, a first channel, a second channel, a third channel, and a magnetic coupling section of the static separation member, wherein the magnetic coupling section is a section of the static separation member. The rotatable female coupling member and the rotatable male coupling member are rotatably coupled by magnets through the magnetic coupling section. The first channel, the second (Continued)

channel, and the third channel contain fluid forced to flow through the first, second, and third channels for cooling and rotodynamic stabilization.

21 Claims, 3 Drawing Sheets

(51) Int. Cl.
  *F04D 25/02* (2006.01)
  *F04D 29/02* (2006.01)
(58) Field of Classification Search
  CPC ... F04D 29/588; F04D 29/026; H02K 49/104; H02K 49/106; H02K 49/10; F16L 23/16
  USPC .......................................... 417/420; 310/103
  See application file for complete search history.

(56) References Cited

U.S. PATENT DOCUMENTS

| | | | |
|---|---|---|---|
| 5,248,245 A * | 9/1993 | Behnke | F04D 29/061 415/110 |
| 5,423,661 A * | 6/1995 | Gabeler | F04C 14/08 210/101 |
| 8,956,067 B2 | 2/2015 | Schneider et al. | |
| 9,145,894 B2 * | 9/2015 | Hoshi | F04D 13/024 |
| 2004/0013546 A1 * | 1/2004 | Klein | F04D 13/026 417/420 |
| 2008/0213087 A1 * | 9/2008 | Wagner | F04D 13/026 415/182.1 |
| 2010/0028176 A1 * | 2/2010 | Platt | F04D 29/048 417/420 |
| 2011/0057456 A1 | 3/2011 | Atallah et al. | |
| 2012/0293031 A1 * | 11/2012 | Atkins | H02K 49/102 310/104 |
| 2014/0265692 A1 * | 9/2014 | Schneider | F04D 29/047 310/104 |
| 2015/0270768 A1 | 9/2015 | Sinnerud | |
| 2015/0322756 A1 * | 11/2015 | Cunningham | F04D 29/061 417/53 |
| 2016/0333677 A1 * | 11/2016 | Westberg | F04D 13/025 |

FOREIGN PATENT DOCUMENTS

| | | |
|---|---|---|
| DE | 9412591 U1 | 10/1994 |
| DE | 102011117183 A1 | 8/2012 |
| WO | WO-2014042626 A1 | 3/2014 |
| WO | WO-2014109648 A1 | 7/2014 |

* cited by examiner

MAGNETIC COUPLING ASSEMBLIES AND PUMP, TURBINE, AND COMPRESSOR INCLUDING THE MAGNETIC COUPLING ASSEMBLY

TECHNICAL FIELD

The present invention relates to magnetic couplings and machines comprising magnetic couplings.

BACKGROUND ART

A demand exists for higher power, lower cost per power or effect coupled for magnetic couplings. The state of the art magnetic coupling, as far as known by the applicant, is described and illustrated in the patent publication U.S. Pat. No. 8,956,067 B2, in the name of Ruhrpumpen GmbH. With the magnetic coupling of said patent, it is possible to couple magnetically up to 800 kW effect or power, at 1800 rpm (rotations per minute). Other embodiments of magnetic couplings are described and illustrated in the patent publications US 2015/0322756 A1, US 2015/0270768 A1, DE 3413930 A1, WO 2014/109648 A1 and US 2011/0057456 A1.

None of the prior art magnetic couplings described in the patent publications mentioned above can couple magnetic power exceeding 800 kW effect at 1800 rpm.

SUMMARY OF INVENTION

The invention provides a magnetic coupling assembly, comprising:
- a rotatable male coupling member comprising magnets;
- a rotatable female coupling member comprising magnets;
- a static separation member arranged between the male and female coupling members,
- a first channel in a gap between the male coupling member and the separation member,
- a second channel in a gap between the female coupling member and the separation member,
- an axial internal channel in the male coupling member,
- a magnetic coupling section of the static separation member, wherein said magnetic coupling section is the section of the static separation member between the magnets of the male coupling member and the magnets of the female coupling member,
- wherein the female and male coupling members are rotatable coupled by the magnets through the magnetic coupling section of the static separation member. The magnetic coupling assembly is distinguished in that:
- the first channel, the second channel and the axial internal channel contains fluid forced to flow through said channels for cooling and rotodynamic stabilization, and
- the magnetic coupling section of the static separation member has a length to diameter ratio larger than one.

The axial channel and the arrangement for flow of fluid through the first, second and axial channels, ensure better cooling and allows higher power magnetic coupling than prior art magnetic couplings. Preferably, the magnets are permanent magnets. Preferably, the magnetic coupling is synchronous. Interchangeably, one of the male and female coupling members is a driving member while the other is a driven member. The axial internal channel in the male coupling member can alternatively be termed a third channel.

Preferably, the magnetic coupling assembly comprises a fourth channel outside the female coupling member, through which fourth channel fluid is forced to flow for cooling and rotodynamic stabilization and flushing. The fourth channel improves cooling and rotodynamic stability further, increasing the power that can be coupled magnetically. With the fourth channel, not only the male coupling member is cooled from the outside and the inside, but also the female coupling member.

The feature that the first channel, the second channel, the axial internal channel and preferably the fourth channel contains fluid forced to flow through said channels for cooling and rotodynamic stabilization, means that fluid flow is provided by one or more fluid circulation circuits, for cooling, rotodynamic stabilization and flushing. Impellers on respective motor shafts, or pump or compressor shafts, or hydraulic power units being part of respective fluid circulation circuits, provide the required forced flow.

The first, second and fourth channels are annular channels, arranged in annular gaps. Preferably, a first fluid or fluid mixture is forced to flow, by pumping, through the first channel and the axial internal channel, on an inside of the separation member, and a second fluid or fluid mixture is forced to flow, by pumping, through the second and fourth channel on an outside of the separation member, however, the first and second fluid or fluid mixtures can be identical. The second fluid can include or be gas. The directions of fluid flow through the channels are preferably fixed, but can be reversed, but for some embodiments, reversed flow direction may result in reduced capability for the magnetic coupling assembly. Preferably, the male member is the driving member, and the fluid forced to flow through the first channel and the axial channel is a liquid or liquid mixture. Typically, for prior art magnetic coupling assemblies, the female member is the driving part, and the female member is surrounded by gas, the gas is not forced to flow.

The magnetic coupling section of the static separation member has a length to diameter ratio larger than one. Said coupling section of the separation member, is the section or length interval in between the magnets of the male and female coupling members. The positive effect of larger length to diameter ratio is an increase in power that can be coupled. A negative effect is possible rotodynamic stability problems. A length to diameter ratio of the magnetic coupling section in a range from 1 to 15 is feasible, more preferably 1 to 10, 1 to 5, 1 to 4, even more preferable 2 to 3. A minimum length to diameter ratio of the magnetic coupling section is 1, more preferably 1,25; 1,5; 2; 2,5; 3; 3,5; or 5. Prior art separation members apparently have said coupling section ratio below 1.

The magnetic coupling assembly preferably comprises a swirl breaker on the static separation member, coaxial to and facing an inlet to the axial internal channel at an end of the male member. Preferably, the swirl breaker comprises grooves on the separation member, such as four, six, eight or twelve radial grooves. The separation member is preferably convex at the center on the inside coaxial to and facing the inlet to the axial internal channel of the male member, at which convex center the swirl breaker preferably is arranged.

Preferably a swirl breaker is arranged on the static separation member in one or both of the first channel and the second channel, optionally also in the fourth channel, preferably at the inlet or outlet part of said channels. Swirl breakers arranged in the channels are formed as grooves parallel to the channel direction, that is parallel to the rotational axis of the magnetic coupling assembly.

Swirl breakers arranged in one or more of the first, second and fourth channel, can be arranged over a part or parts or the full length of one or more of said channels. Swirl breakers can be arranged isolated from other dimensional changes in any of said channels, or combined, such as upstream and/or downstream.

In general, swirl breakers can be in the form of grooves, ribs, honeycomb patterns or similar, in any combination, with the dimensional size ranges or limits as set forth below, from structure top to bottom in a channel clearance gap.

Each of the swirl breakers are in the form of grooves with distance from groove bottom to groove top in the range 0.05-0.98 of the gap for flow, the gaps are radial or axial or combinations thereof, preferably 0.1-0.9, more preferably 0.2-0.8, 0.3-0.7 or 0.3-0.6, such as about 0.5 times the radial or axial or axial-radial gap for flow. Swirl breakers preferably have a minimum radial or axial or axial-radial distance from groove bottom to groove top of at least 0.05; 0.1; 0.15 or 0.2 times of the radial or axial or axial-radial gap for flow. Swirl breakers reduce pressure drops due to turbulence, prevent swirling, improving the cooling and hence capability of the magnetic coupling.

Swirl breakers are arranged on static structure, that is on the static separation member, and preferably also on static structure radially outside the fourth channel.

Preferably, one or both of the first and second channels, optionally also the fourth channel, in a direction of flow, has a non-uniform radial gap for flow, wherein the radial gap is stepwise and/or gradually decreasing or increasing along the direction of flow. The stepwise or gradual change in radial gap preferably is in the range 0.05-0.98 of the radial gap for flow, preferably 0.1-0.9, more preferably 0.2-0.8, 0.3-0.7 or 0.3-0.6, such as about 0.5 times the radial gap for flow.

Non-uniform radial gap for flow preferably is arranged in the static separation member and/or on static structure radially outside the fourth channel, by dimensional changes, but can be made in the male or female member.

Preferably, one or both of the first and second channels, optionally also the fourth channel, in a direction of flow, comprises a sealing surface in the form of a section of reduced cross section or radial gap for flow compared to the rest of the radial gap or cross section for flow in the channel. The stepwise or gradual change in radial gap preferably is in the range 0,05-0,98 of the radial gap for flow, preferably 0,1-0,9, more preferably 0,2-0,8, 0,3-0,7 or 0,3-0,6, such as about 0,5 times the radial gap for flow. Sealing surfaces preferably are arranged in the static separation member or on static structure radially outside the fourth channel, by dimensional changes.

Preferably, a swirl breaker is arranged at an inlet side or at an outlet side or both at an inlet and outlet side of a sealing surface, in the direction of fluid flow, for one or more of the sealing surfaces and channels, in any combination. For embodiments comprising one or more of the combination of a swirl breaker arranged at an inlet side and/or outlet side of a sealing surface, in the direction of fluid flow, said combined swirl breaker and sealing surface are arranged in the static separation member, on an inside or an outside or both, preferably also on static structure radially outside the fourth channel.

Any one of the first, second and fourth channel, in any combination, can comprise one or more sections with larger cross section area or gap for flow, followed by or not followed by sealing surfaces having in comparison reduced cross section area or gap for flow. The sealing surfaces in this context are fluid dynamic non-contacting sealing surfaces, meaning that the static separation member is not in physical contact with the rotating male of female coupling member. The effect is improved rotodynamic stability. The variation in geometry preferable for enhancing the rotodynamic stability preferably is made in the static separation member.

The static separation member preferably is bell-shaped, with a in substance concave inside shape and a convex outside shape at the closed end, with a central protrusion on the inside, coaxial to and facing the inlet to the axial channel at the end of the male member. Preferably, said protrusion includes a swirl breaker in the form of radial grooves.

Preferably, the separation member is bell-shaped, with an in substance concave inside shape and a convex outside shape at the closed end. Such rounded shape, above a minimum radius, at least on parts taking up loads, eliminates stress concentrations. Prior art separation elements typically are box-shaped, with sharp corners and edges resulting in stress concentrations limiting the capability of the member.

The magnetic coupling assembly preferably comprises a non-ferromagnetic and non-electrical conductive separation member, preferably a ceramic material separation member, preferably comprising $ZrO_2$. Alternative materials are other ceramics, non-ferromagnetic alloys, polymers and composite material. Eddy currents cause energy losses in electric conducting materials. Ferromagnetic materials, commonly termed magnetic materials, may cause stability problems in addition to energy losses. Avoiding the losses or stability problems allow higher power, effect and/or speed to be coupled magnetically.

Preferably, the static separation member has increased wall thickness in sections outside the magnetic coupling section, at the top part of the hat and at the base, as seen oriented with the closed end facing upwards and the open end facing downwards. In other words, the separation member, as seen oriented with the closed end facing upwards and the open end facing downwards, has shape as a hat with rounded top; preferably comprising a curved inside of the top where a central part extends downwards a distance, coaxial to and facing a center of an opening of the axial internal channel of the male member as assembled and inserted; preferably with a thinner cylindrical wall in the coupling section between the magnets of the male and female coupling members; and thicker wall at a base, preferably with a flange extending outwards at the base, and thicker wall at the top.

Preferably, the female coupling member comprises openings, functioning as inlets or outlets for flow of fluid. The openings increase the maximum fluid flow rate and hence cooling and stability.

One of the magnetic coupling members is a driving member and the other is a driven member, interchangeably. The separation member preferably is a part of a hermetically sealed compartment including a motor and the driving member operatively connected, preferably as the driving side of a magnetically coupled machine, such as a subsea pump or compressor or a pump or compressor for unmanned operation. A barrier fluid system, a supply system for barrier fluid including HPU (hydraulic power unit), long supply lines and sophisticated pressure control systems can be eliminated. The motor compartment with the driving side of the magnetic coupling can be filled with fluid, such as a combination of water and glycol or an oil or oil mixture, for a long operation period that may cover the full operation lifetime. Such machines comprising the magnetic coupling assembly of the invention, such as pumps and compressors, are embodiments of the present invention.

The invention provides non-contact transfer of rpm, kW, and torque, at levels of effect or combinations of said parameters not seen before. Over 1 MW transferred effect, combined with over 3600 rpm, is achievable. Process fluid can be hermetically isolated from motor compartment driving side fluid. All seals can be static seals. The operation temperature of the magnetic coupling can be kept low due to improved cooling, such as temperature below 80° C. even at the toughest operating conditions, improving reliability and coupling power. The rotodynamic stability is enhanced, allowing smaller radial gaps in the channel and longer coupling section. The cooling, stabilization and flushing by the fluid flowing through the channels prolong service life. The magnetic coupling of the invention also functions as or provide effect as a balancing drum. The magnetic coupling of the invention is modular and can be used in many systems and machines.

DETAILED DESCRIPTION OF THE INVENTION

The sealing surfaces are non-contact sections of reduced cross section area or radial gap for flow. The radial gap clearance is preferably but not necessarily constant along the sealing surface section. The radial gap clearance in the sealing surface sections is less than else in the flow channel, typically about 0.1 mm to 2 mm, preferable 0.2-1.5 mm, 0.2-1.2 mm, or most preferable 0.4-1 mm. Normal radial channel clearance, in the magnetic coupling section, typically is 0.3 mm to 8 mm, more preferable 0.4-3 mm, 0.4-2.5 mm or most preferable 0.4-2 mm. The sealing surfaces are arranged within or outside the magnetic coupling section of the separation member, preferably just inside or outside the ends thereof. Preferably with a swirl breaker at the inlet, as seen in the direction of fluid flow.

The minimum radius of any part of the static separation member subject to load fluctuations, is $R_{min}$=1 mm or 2 mm, more preferably 3 mm, even more preferably 5 mm.

Some further detailed description is found below, including identical or synonymous or equivalent terminology as in the claims and the description above. For the skilled person, the meaning will be clear from the context.

Figure 1:
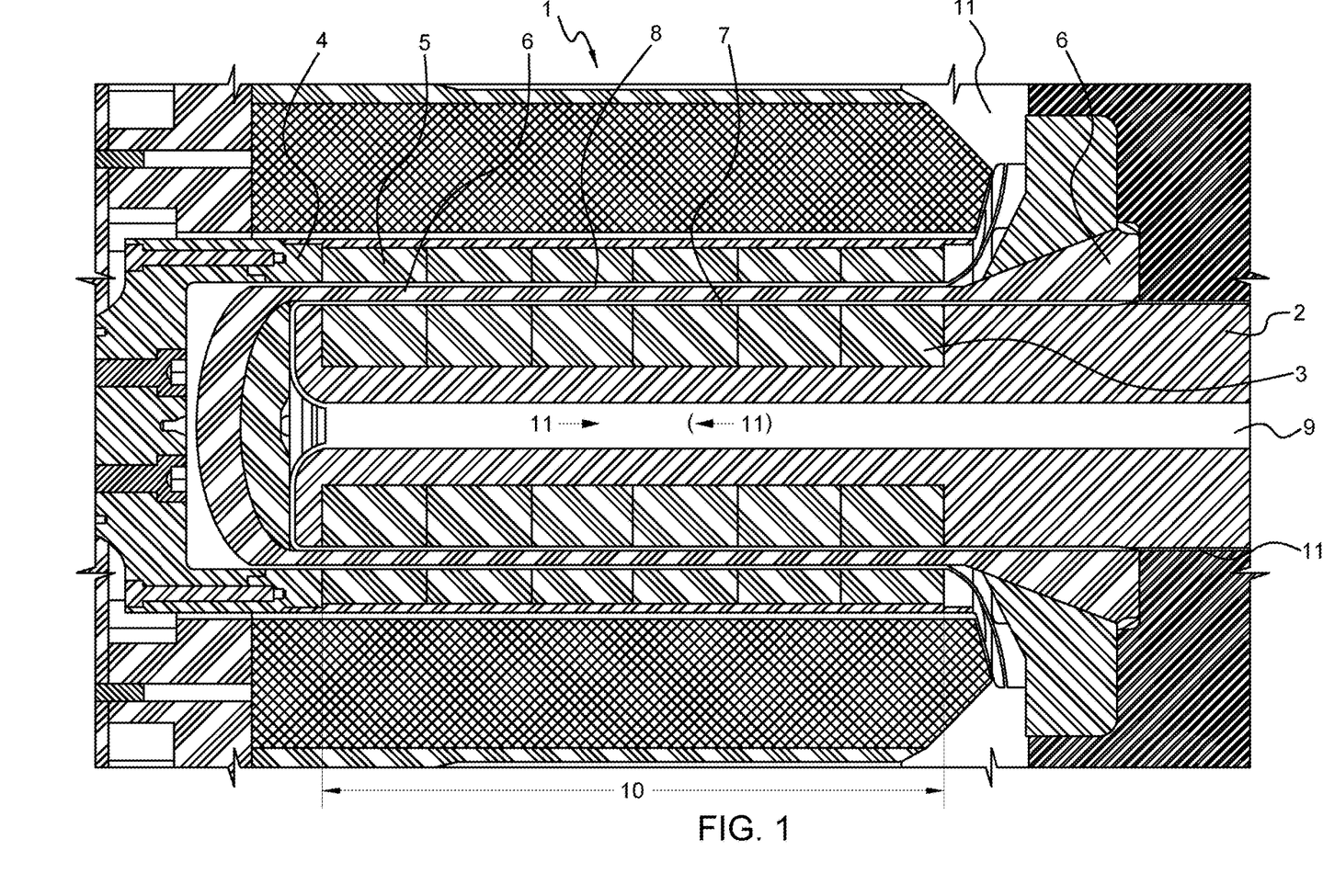
FIG. 1 illustrates one embodiment of a magnetic coupling of the present invention.

Reference is made to FIG. 1, a longitudinal section drawing, illustrating: A magnetic coupling assembly 1, comprising: a rotatable male coupling member 2 comprising magnets 3; a rotatable female coupling member 4 comprising magnets 5; and a static separation member 6 arranged between the male and female coupling members. A first channel 7 is arranged in a gap between the male coupling member and the separation member; a second channel 8 is arranged in a gap between the female coupling member and the separation member, and an axial internal channel 9 is arranged in the male coupling member. A magnetic coupling section 10 of the static separation member 6, is the section of the static separation member between the magnets of the male coupling member and the magnets of the female coupling member. The female 4 and male 2 coupling members are rotatable coupled by the magnets through the magnetic coupling section of the static separation member. The first channel 7, the second channel 8 and the axial internal channel 9 contains fluid 11 forced to flow through said channels for cooling and rotodynamic stabilization. The magnetic coupling section 10 of the static separation member 6 has a length to diameter ratio larger than one, in the illustrated embodiment about 2.2.

Figure 2:
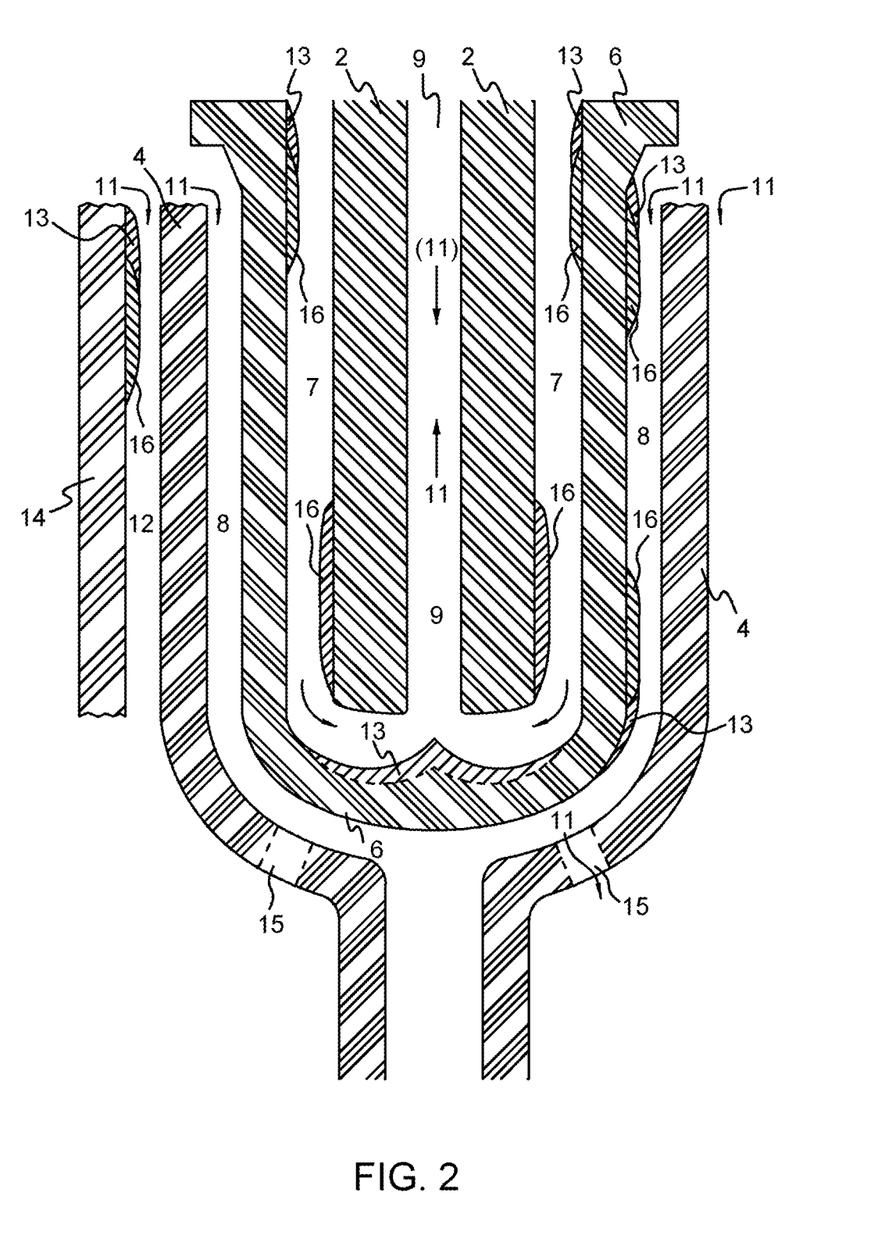
FIG. 2 illustrates details of an embodiment of the invention.

Further reference is made to FIG. 2, illustrating examples of details, in longitudinal section, out of scale and not necessarily rotation symmetrical to illustrate said details more clearly. In real embodiments, the scale is like the scale of FIG. 1, and features are rotation symmetric about the rotation axis coaxial to channel 9. FIG. 2 illustrates, on one side only, a fourth channel 12 arranged outside the female coupling member, between the female coupling member and structure 14 outside the female coupling member, which fourth channel contains fluid forced to flow for cooling and rotodynamic stabilization. On static structure 14, on the side facing the fourth channel 12, from the inlet, a swirl breaker 13 is arranged upstream to a sealing surface 16. A swirl breaker 13 is arranged on the static separation member 6, coaxial to and facing an inlet to the axial internal channel 9 at an end of the male member. The separation member is bell-shaped, with a central protrusion on the inside, coaxial to and facing the inlet to the axial channel at the end of the male member, wherein said protrusion includes a swirl breaker 13 in the form of radial grooves. A swirl breaker 13 upstream of and as combined with a sealing surface 16, is arranged on the static separation member in the inlet side of the first channel. On the male member 2, towards of the end of the first channel, a sealing surface 16 is arranged. In the second channel 8, on the outside of the static separation member 6, a swirl breaker 13 as combined with a downstream sealing surface 16 is arranged from the inlet and a sealing surface 16 upstream of a swirl breaker 13 is arranged towards the outlet 15.

Accordingly, the first and second and fourth channels, in a direction of flow, has a non-uniform radial gap for flow, wherein the radial gap is stepwise or gradual decreasing or increasing along the direction of flow. More specifically, in the first channel 7, in the direction of flow in the illustrated embodiment from the base to the end of the male member, on the inside of the static separation member, at the inlet of the first channel, swirl breaker 13 is followed by a sealing surface 16. The top of longitudinal grooves in the swirl breaker and of the sealing surface have radial gap clearance of for example 1.5 mm. A downstream part of the first channel with larger gap for flow, for example 2.5 mm, then follows, further followed by a sealing surface 16 at the end of the first channel, arranged as a conical-constant larger diameter-conical decreasing diameter towards the end of the male coupling member 2. The second channel inlet has a swirl breaker 13 arranged, followed by a sealing surface 16 section, arranged on the outside of the static separation member 6, with swirl breaker top and sealing surface radial gap of for example 1 mm, followed by a section of increased radial gap, for example 2 mm. Towards the second channel 8 outlet, on the outside of the static separation member 6, a sealing surface 16 is followed by a swirl breaker 13, as seen in the direction of flow. The fourth channel has a swirl breaker 13 and sealing surface 16 arranged at the inlet end of said channel, the required grooves and thicker structure is arranged on static structure 14 outside the fourth channel. The female coupling member comprises openings 15, functioning as inlets or outlets for flow of fluid 11.

Figure 3:
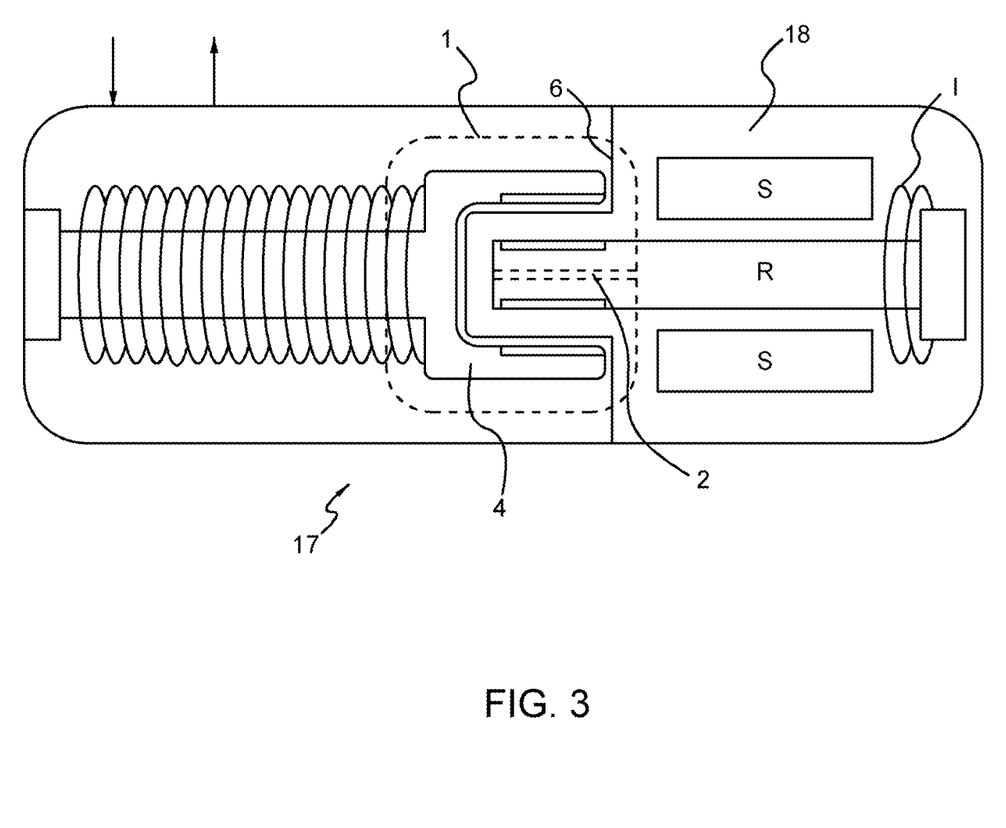
FIG. 3 illustrates a further embodiment of a magnetic coupling of the present invention, in a pump.

Further reference is made to FIG. 3, illustrating a magnetic coupling assembly of the invention arranged in a pressure booster 17. The motor compartment includes the driving side of the magnetic coupling assembly, in this embodiment the male member 2, hermetically isolated from the pumped process fluid by the static separation member 6. The motor compartment is filled with water and glycol mixture or oil. Preferably, the motor compartment pressure is in principle constant. An impeller I in the motor compartment pumps the fluid for cooling and rotodynamic stabilization through the channels of the magnetic coupling assembly. In addition to increased power, effect and rpm, as used in a pressure booster such as a pump, multiphase fluid pump or compressor, advantages are no barrier fluid system required, no umbilical supply of barrier fluid or liquid required, no dynamic seals required, lower cost and increased reliability. The advantages are particularly valuable if used for pressure boosters subsea or on unmanned platforms or locations.

Some Further Discussion on Features and Technical Solutions of the Magnetic Coupling Assembly of the Invention.

A New Approach to Subsea Boosting Using Magnetic Couplings.

While there have been individual solutions considered for the use of magnetic couplings to each of these challenges, each of the solutions to date aggregate other challenges such that a feasible solution has not been found under the existing state of the art for the use of magnetic couplings in subsea boosters. The invention described herein, addresses each of the challenges described above and enables the ability to operate a 200 kW-3 MW or up to 8 MW (with the preferred embodiment being 400 kW-3 MW or up to 8 MW) magnetically coupled subsea booster with low energy losses and high boosting and pressure containment capabilities.

The invention does not change the basic industry standard of using steel housings for the pump and motor of the booster. As a result, the booster is designed to operate in a subsea environment and handle high ambient pressures and high internal pressures and variable pressures. Internally, there are changes in some of the internal materials of the coupling as well as design changes to the coupling to enable the use of the new materials in a subsea environment. In addition, as will be described below, through the elimination of some internal components that have historically created internal pressure differentials, the claimed invention will allow for the use of less thick and/or less costly steel materials for the external housing of the booster which reduces the booster costs.

The key enabling aspects of the invention are its ability to increase the boosting power of a subsea booster driven by a magnetic coupling through (i) a decrease in magnetic force transfer losses and (ii) a decrease of frictional (viscous) losses between rotating and stationary surfaces. The invention achieves these objectives through a new coupling design and the enablement of the use of materials not previously thought to be feasible for use in a subsea magnetic coupling.

New Design and Materials to Lower Magnetic Transfer Losses.

One of the biggest impediments to the use of magnetic couplings for subsea boosting has been the inherent magnetic force transfer losses that are expected when adapting a magnetic coupling for use in a subsea environment.

In order to maximize the efficiency of magnetic force transfer within a magnetic coupling, eddy current losses need to be eliminated to the largest extent possible. Eddy currents will flow in closed loops within electrical conductors (such as most steel types), in planes perpendicular to the magnetic field as a result of changes in the magnetic field. In magnetic couplings, the magnetic field alternates with the rotation of the booster whereas the internal static pressure shell separating the coupling driving- and driven section is stationary. Eddy currents consume electromagnetic power that lowers the torque output and result in heat dissipation with increasing temperatures that must be countered with efficient cooling.

As described above, eddy currents lower the efficiency of a magnetic coupling and occur in conducting materials. Therefore, it is beneficial to avoid the use of conducting materials and use electrically non-conducting materials instead. Electrically non-conducting materials have been used in magnetic couplings in various non-subsea applications, but these applications until now have their own inherent challenges. For example, ceramic and other similar materials have been used in non-challenging environments where there are consistent pressures and omnidirectional flow. These materials, however, have not been contemplated for subsea boosters because the materials are inherently brittle and therefore unable to handle substantial tensile stresses and are therefore prone to cracking in applications where the magnetic coupling barrier (pressure bell) during operation is subject to bi-directional pressure changes.

Similarly, electrically non-conducting materials such as plastics and composites have not been used because they suffer from degradation of material properties over time that can cause failure related to inability to maintain shape and/or form tolerances or failure to maintain a pressure barrier due to contamination over time.

As noted above, steel alloys have traditionally been used as the internal pressure shell of a magnetic coupling in order to provide the high strength and ductility required to absorb varying load dependent conditions. Scaling up a magnetic coupling with an internal steel pressure shell to handle the power required for a subsea application severely limits the overall efficiency of the magnetic coupling and has acted as a technical barrier to the adoption of higher powered magnetic couplings for subsea applications.

Another important factor in the magnetic force transfer is the distance between magnets, the greater the distance between magnets in magnetic coupling female- and male portions, the lower the magnetic force transfer. Accordingly, a preferred design for a magnetic coupling is one where the distances between the magnets is as small as reasonably practical.

The invention incorporates a new design and geometrical profile that enables the use of an electrically non-conducting (preferably a ceramic material) internal barrier (separating the driver magnetic coupling section from the driven magnetic coupling section) in the magnetic coupling. This new design reduces the magnetic force transfer losses, and therefore increases power and efficiency of the subsea booster. The design further addresses the issue of brittleness of ceramics and other similar materials for use in a subsea magnetic coupling through the incorporation of a unique controlled mechanical tensile stress reliever that gradually reduces stress concentrations and reduces the risks of cracking of the pressure containment bell. These designs further allow for the magnetic coupling to have the required compressive strength to handle the variable and bi-directional pressure requirements of a subsea booster.

The controlled tensile stress relief feature of the invention is incorporated in an electrically non-conducting pressure containment bell (the static separation member) (preferably ceramic) through the means of a wedge-shaped transition of thickness towards the base of the pressure bell that enables the brittle material to be able to handle tensile stresses resulting from a high pressure acting on the inside of the pressure bell. The pressure bell is provided with additional strength and stability by being mounted inside a metallic main body flange and kept in place axially onto a mounting plate/main body flange by a metallic axial lock ring. The combination of the tapered pressure bell, lock ring and flange enable the pressure bell design to accommodate high external pressures and variable bi-directional pressures while reducing axial stresses on the pressure bell.

The use of non-steel high compressive strength materials for the pressure containment bell also enables the magnetic coupling to have a small gap between the magnets, thereby increasing magnetic energy transfer.

New Design to Reduce Frictional (Viscous) Losses.

The relationship between torque and power in a magnetic coupling is proportional with speed. In a booster driven by a magnetic coupling, the higher the speed of the booster at a given torque limit, the higher the power rating of the overall boosting system.

The energy efficiency of a magnetic coupling under the prior art decreases at higher speeds due to viscous losses increasing from the shear stresses that occur due to high velocity gradients in the fluid trapped between rotating and stationary parts. As a result, the power requirements to operate a subsea booster would increase under the prior art in tandem with the loss in energy efficiency. Accordingly, if the reduction in energy efficiency causes the power requirement for generating the boosting capabilities for a subsea booster with a magnetic coupling to be in excess of a certain size, the subsea booster will not be feasible or economic. This circumstance has until now been a practical barrier to the use of magnetic couplings for subsea boosting systems.

Increased Length to Diameter Ratio.

Viscous losses typically scale to the fourth power with diameter increase versus to the second power with length increase. Thus, a high length over diameter ratio is preferred in order to limit the viscous loss increase while scaling up the geometry of the magnetic coupling. Thus, one aspect of the invention is that the pressure bell described earlier has a length to diameter ratio in excess of 1 in order to limit the increase in viscous losses created by increased operating speed and related temperatures.

One challenge with the use of a high length to diameter ratio (i.e., length to diameter ratio >1), is the rotor-dynamic stability of the magnetic coupler female portion and magnetic coupler male portion. This is particularly the case for liquid pumping. In general, liquid-filled rotors will suffer more from the effect of negative stiffness and added mass of liquid compared to, for example, gas-filled rotors. The higher the length/diameter ratio, the more dominant the instability becomes.

Rotor instability also affects the ability to utilize brittle materials for the pressure containment bell. To mitigate the rotor-dynamic instability effects of a high length to diameter ratio and to enable the use of ceramics and other brittle materials in the design of the pressure containment bell, the invention includes a rotor-dynamic stabilizing feature in the preferred embodiment. The feature comprises of a clearance between a rotating surface and a stationary surface geometry whereby a flow channel is created between the surfaces. Including one or a plurality of clearances between a rotating surface (such as magnetic coupling female portion and/or male coupling portion) and a stationary surface element provides rotor-dynamic stability in the presence of a sufficiently high mass flow along the axial direction of the flow channel. The flow channel provides a rotor-dynamically stabilizing "support" for the rotating element. The flow channel is preferably either be a straight flow channel or a diverging or converging flow channel. Straight is defined as the flow channel having a constant cross-sectional area of the clearance between the rotating surface and the stationary surface along the axial direction. A converging flow channel is having a reduction in cross-sectional area of the clearance between the rotating surface and the stationary surface along the axial direction. A divergent flow channel is having an increase in cross-sectional area of the clearance between the rotating surface and the stationary surface along the axial direction.

The preferred embodiment of the magnetic coupling includes a divergent or convergent flow channel between the magnetic coupling male part and the pressure bell.

Reduced Viscous Losses.

One of the largest practical limitations on the speed of a magnetic coupling will be caused by efficiency reductions due to increase in viscous losses resulting from shear stresses that occur due to high velocity gradients in the fluid trapped between rotating and stationary parts (e.g. between the magnetic coupling female portion outer diameter and stationary parts and between pressure bell and magnetic coupling female portion rotor and between pressure bell and magnetic coupling male portion rotor). This condition will not only decrease the viscous efficiency but also increase the temperature as frictional losses result in heating up the fluid. To handle the temperature increase, existing solutions might design for an increase in cooling fluid throughput by increasing the clearances between rotating (female- and male coupling portion magnets) and static parts (such as the pressure bell), but that solution will in turn negatively impact the magnetic energy efficiency of the magnetic coupling.

In order to maintain acceptable temperatures and reduced viscous losses at higher speeds, the magnetic coupling of the invention has a means of transporting heat away from the fluid by means of a cooling medium between the pressure bell and the rotating magnetic coupling female and magnetic coupling male parts. The cooling is effected through geometry inside the pressure bell that features a double arc profile so as to provide a means to control the cooling flow through the flow channel between the male coupling portion and the pressure bell for entering the male coupling portion shaft centerline cooling flow outlet.

The invention claimed is:

1. A magnetic coupling assembly comprising:
   a rotatable male coupling member comprising magnets and rotatable about a rotational axis;
   a rotatable female coupling member comprising magnets and rotatable about the rotational axis;
   a static separation member arranged between the rotatable male coupling member and the rotatable female coupling member;
   a first channel in a gap between the rotatable male coupling member and the static separation member;
   a second channel in a gap between the rotatable female coupling member and the static separation member;
   a third channel formed as an axial internal channel, in the rotatable male coupling member;
   a magnetic coupling section of the static separation member, wherein the magnetic coupling section is a section of the static separation member between the magnets of the rotatable male coupling member and the magnets of the rotatable female coupling member;
   wherein the rotatable female coupling member and the rotatable male coupling member are rotatably coupled by the magnets through the magnetic coupling section;

wherein the first channel, the second channel, and the third channel contain a fluid forced to flow through the first, second, and third channels for cooling and rotodynamic stabilization;

wherein the magnetic coupling section has a length-to-diameter ratio larger than one; wherein the static separation member is a hat-shaped static separation member arranged coaxial to the rotational axis;

wherein the rotatable male coupling member is a rod-shaped member and is arranged coaxially inside the hat-shaped static separation member;

wherein the rotatable female coupling member is a cup-shaped member and arranged coaxially outside the hat-shaped static separation member; and at least one of:

a swirl breaker on the hat-shaped static separation member, coaxial to and facing an inlet to the third channel at an end of the rotatable male coupling member; and a swirl breaker on the hat-shaped static separation member in one or both of the first channel and the second channel, at an inlet part of the first, second, and third channels; and each of the at least one swirl breaker forming a groove with a distance from a groove bottom to a groove top in a range 0.05-0.95 of a gap size for a flow of the fluid.

2. The magnetic coupling assembly of claim 1, comprising a fourth channel outside the rotatable female coupling member, wherein the fourth channel contains the fluid forced to flow for cooling and rotodynamic stabilization.

3. The magnetic coupling assembly of claim 1, wherein the rotatable male coupling member is a driving member, and the fluid forced to flow through the first channel and the third channel is a liquid or liquid mixture.

4. The magnetic coupling assembly of claim 1, wherein the hat-shaped static separation member has a concave inside shape and a convex outside shape at a closed end, with a central protrusion on the inside, coaxial to and facing an inlet to the third channel at the end of the rotatable male coupling member, wherein the central protrusion includes a swirl breaker forming radial grooves.

5. The magnetic coupling assembly of claim 1, wherein one or both of the first and second channels, in a direction of the flow, have a non-uniform radial gap for the flow, wherein the non-uniform radial gap is at least one of stepwise and gradually decreasing or increasing along the direction of the flow for improved rotodynamic stability.

6. The magnetic coupling assembly of claim 2, wherein one or more of the first, second, and fourth channels, in a direction of the flow, comprise a sealing surface forming a section of a reduced cross section or radial gap for the flow compared to the rest of the radial gap or cross section for the flow, for improved rotodynamic stability.

7. The magnetic coupling assembly of claim 1, wherein the magnetic coupling section comprises a non-ferromagnetic and non-electrical conductive separation member.

8. The magnetic coupling assembly of claim 1, wherein the hat-shaped static separation member has an increased wall thickness in sections outside the magnetic coupling section, at a top part and at a base, as seen oriented with a closed end of the hat-shaped static separation member facing upwards and an open end of the hat-shaped static separation member facing downwards.

9. The magnetic coupling assembly of claim 1, wherein the hat-shaped static separation member, as seen oriented with a closed end of the hat-shaped static separation member facing upwards and an open end of the hat-shaped static separation member facing downwards, has a rounded top, a curved inside of the rounded top where a central part extends a distance downwards, coaxial to and facing a center of an opening of the axial internal channel of the rotatable male coupling member as assembled and inserted and a thinner cylindrical wall in the magnetic coupling section between the rotatable male coupling member and the rotatable female coupling member and a conical thicker wall at a base, with a flange extending outwards.

10. The magnetic coupling assembly of claim 1, wherein the rotatable female coupling member comprises openings through a closed end thereof, functioning as inlets or outlets for the fluid forced to flow.

11. The magnetic coupling assembly of claim 1, wherein one of the rotatable male or female coupling members is a driving member and the other is a driven member, wherein the hat-shaped static separation member is a part of a hermetically sealed compartment including a motor and the driving member operatively connected.

12. The magnetic coupling assembly of claim 1, wherein a rotational speed of 3000 up to at least 8000 rpm as combined with a coupling effect above 800 kW, can be coupled magnetically.

13. A pump comprising the magnetic coupling assembly according to claim 1.

14. A compressor comprising the magnetic coupling assembly according to claim 1.

15. A turbine comprising the magnetic coupling assembly according to claim 1.

16. A magnetic coupling assembly comprising:

a rotatable male coupling member comprising magnets;

a rotatable female coupling member comprising magnets;

a static separation member arranged between the rotatable male coupling member and the rotatable female coupling member;

a first channel in a gap between the rotatable male coupling member and the static separation member;

a second channel in a gap between the rotatable female coupling member and the static separation member;

a third channel formed as an axial internal channel in the rotatable male coupling member;

a magnetic coupling section of the static separation member;

wherein the magnetic coupling section is a section of the static separation member between the magnets of the rotatable male coupling member and the magnets of the rotatable female coupling member;

wherein the rotatable female coupling member and the rotatable male coupling member are rotatably coupled by the magnets through the magnetic coupling section of the static separation member;

wherein the first channel, the second channel, and the third channel contain a fluid forced to flow through the first, second, and third channels for cooling and rotodynamic stabilization;

wherein the magnetic coupling section of the static separation member has a length to diameter ratio larger than one;

and a swirl breaker on the static separation member, coaxial to and facing an inlet to the third channel, at an end of the rotatable male coupling member.

17. The magnetic coupling assembly of claim 16, comprising the swirl breaker on the static separation member in one or both of the first channel and the second channel, at an inlet part of the first, second, and third channels, each of the swirl breakers forming a groove with a distance from a groove bottom to a groove top in a range 0.05-0.95 of a gap size for a flow of the fluid.

18. A magnetic coupling assembly comprising:
a rotatable male coupling member comprising magnets;
a rotatable female coupling member comprising magnets;
a static separation member arranged between the rotatable male coupling member and the rotatable female coupling member;
a first channel in a gap between the rotatable male coupling member and the static separation member;
a second channel in a gap between the rotatable female coupling member and the static separation member;
a third channel formed as an axial internal channel in the rotatable male coupling member; a magnetic coupling section of the static separation member;
wherein the magnetic coupling section is a section of the static separation member between the magnets of the rotatable male coupling member and the magnets of the rotatable female coupling member;
wherein the rotatable female coupling member and the rotatable male coupling member are rotatably coupled by the magnets through the magnetic coupling section of the static separation member;
wherein the first channel, the second channel, and the third channel contain a fluid forced to flow through the first, second, and third channels for cooling and rotodynamic stabilization;
wherein the magnetic coupling section of the static separation member has a length to diameter ratio larger than one;
wherein the static separation member is a bell-shaped member, with a concave inside shape and a convex outside shape at a closed end, with a central protrusion on the inside, coaxial to and facing an inlet to the third channel at an end of the rotatable male coupling member; and
wherein the central protrusion includes a swirl breaker forming radial grooves.

19. The magnetic coupling assembly of claim 1, wherein the magnetic coupling section of the static separation member has a length to diameter ratio larger than 1.5.

20. The magnetic coupling assembly of claim 1, wherein the magnetic coupling section of the static separation member has a length to diameter ratio larger than 2.

21. The magnetic coupling assembly of claim 1, wherein a rotational speed of 3000 up to at least 8000 rpm as combined with a coupling effect above 800 kW, can be coupled magnetically.

* * * * *